(12) United States Patent
Klink

(10) Patent No.: US 6,580,688 B1
(45) Date of Patent: Jun. 17, 2003

(54) SWITCHING TRANSMISSION UNITS TO AN EQUIVALENT CIRCUIT FOR THE PURPOSES OF BIDIRECTIONAL ASYNCHRONOUS CELL TRANSFER

(75) Inventor: Joachim Klink, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/297,157

(22) PCT Filed: Oct. 27, 1997

(86) PCT No.: PCT/DE97/02495

§ 371 (c)(1),
(2), (4) Date: Apr. 23, 1999

(87) PCT Pub. No.: WO98/20699

PCT Pub. Date: May 14, 1998

(30) Foreign Application Priority Data

Nov. 7, 1996 (DE) .......................... 196 46 016

(51) Int. Cl.[7] .............................................. G01R 31/08
(52) U.S. Cl. .................... 370/220; 370/220; 370/228
(58) Field of Search .................... 370/217, 225, 370/220, 228, 395.1; 714/4

(56) References Cited

U.S. PATENT DOCUMENTS 5,412,652 A * 5/1995 Lu .......................... 370/85.12
5,715,237 A * 2/1998 Akiyoshi .................... 370/228
5,808,920 A * 9/1998 Zwan ......................... 364/579
5,870,382 A * 2/1999 Tounai et al. ............... 370/220

FOREIGN PATENT DOCUMENTS

| DE | 43 31 577 A1 | 3/1995 |
| WO | WO 94/28646 | 8/1994 |
| WO | WO 95/24085 | 8/1995 |

OTHER PUBLICATIONS

IEICE Transactions on Communications, vol. E78–B, No. 7, Jul. 1, 1995, M. Azuma et al, "Network Restoration Algorithm for Multimedia Communication Services and Its Performance Characteristics", pp. 987–994.

IEEE Communications Magazine, vol. 33, No. 9, Sep. 1, 1995, Eiji Oki et al, "Multiple-Availability-Level ATM Network Architecture", pp. 80–88.

* cited by examiner

*Primary Examiner*—Dang Ton
*Assistant Examiner*—Robert W. Wilson
(74) *Attorney, Agent, or Firm*—Bell, Boyd & Lloyd LLC

(57) ABSTRACT

The prior art for the switching of ATM cells to an equivalent circuit involves the problem of incorrect switching operations. The method provides a remedy for this by virtue of the fact that when there is a fault on a service link an equivalent circuit switching operation onto just one standby link is controlled in accordance with priority criteria and logic operation information.

11 Claims, 7 Drawing Sheets

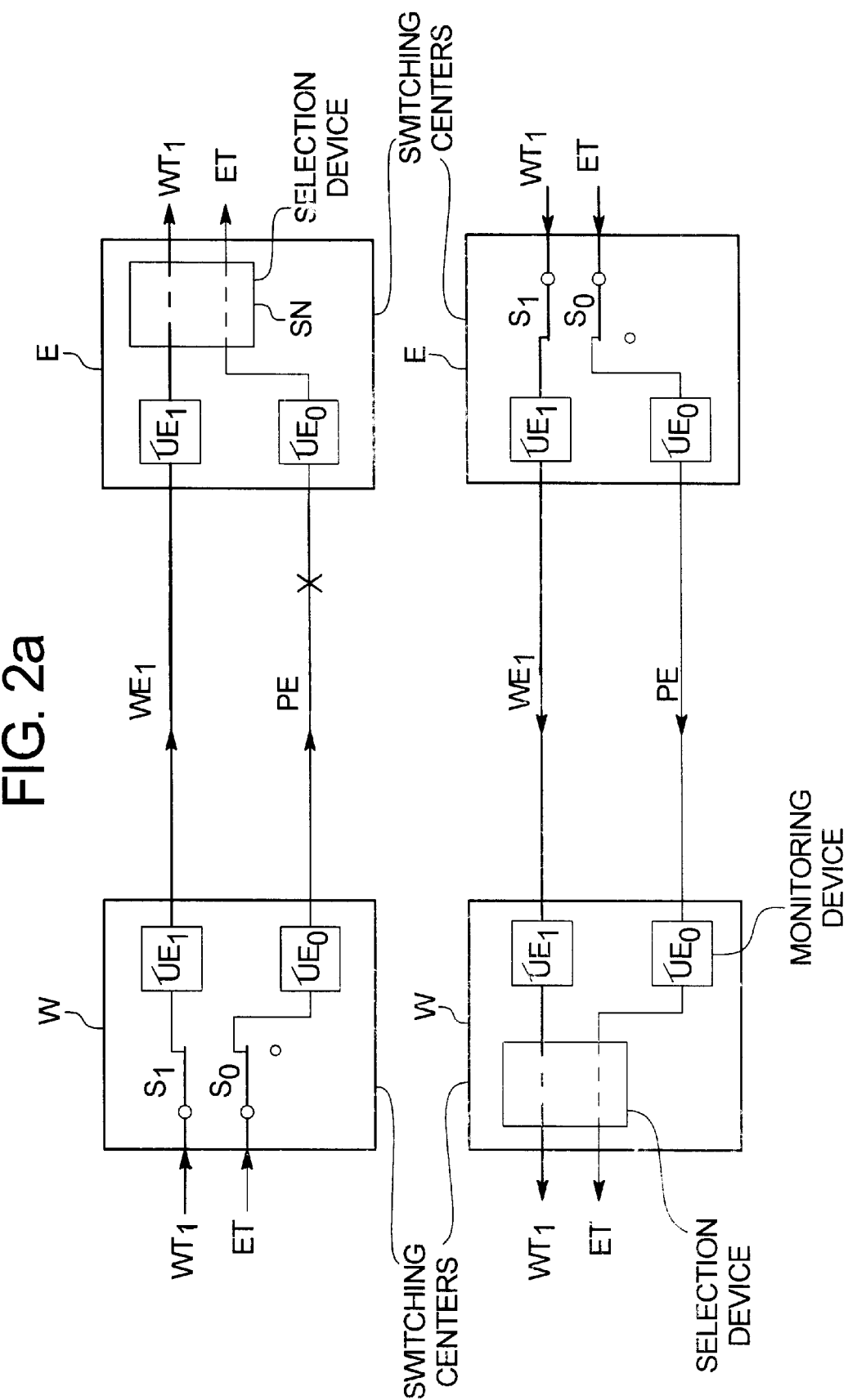

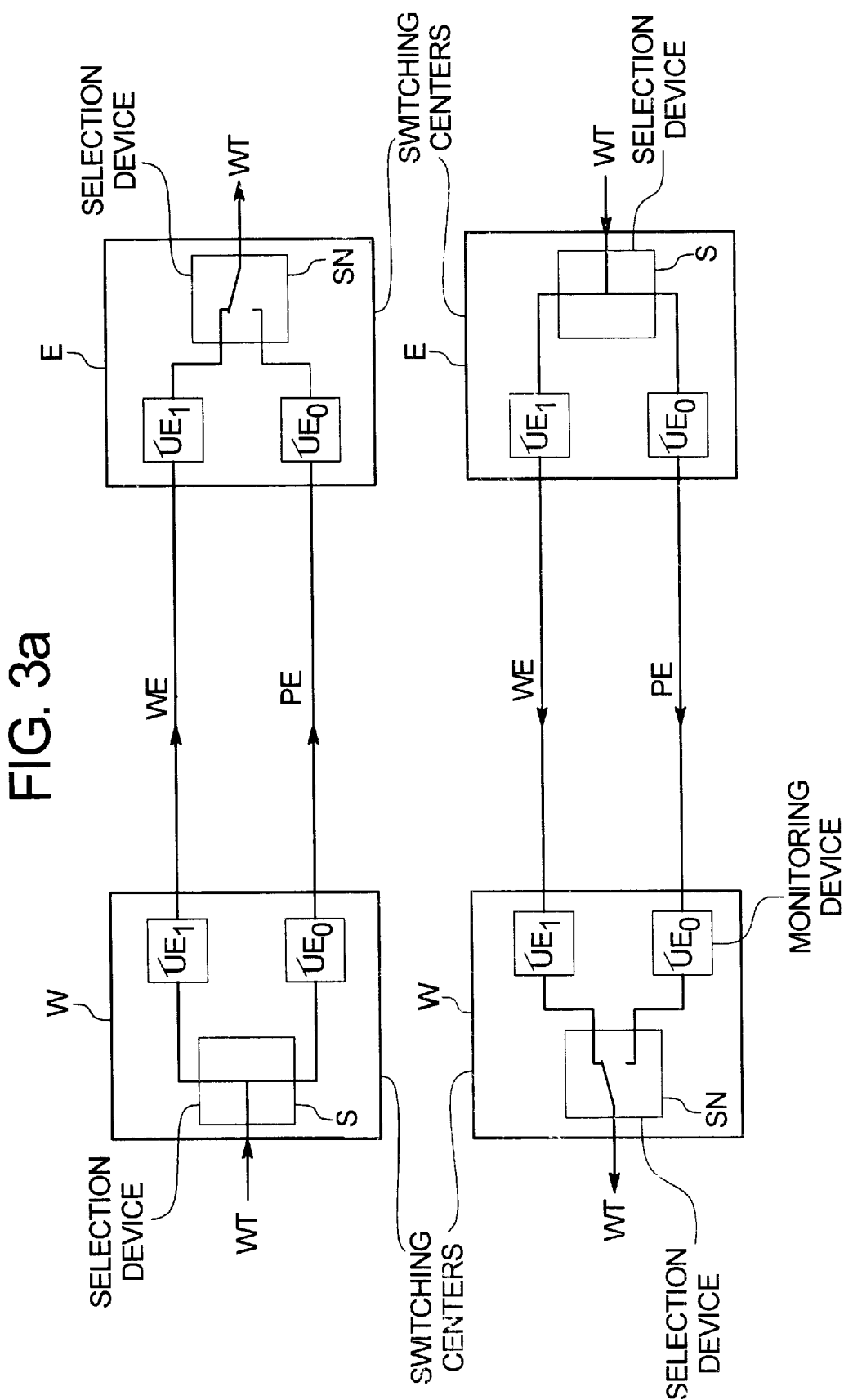

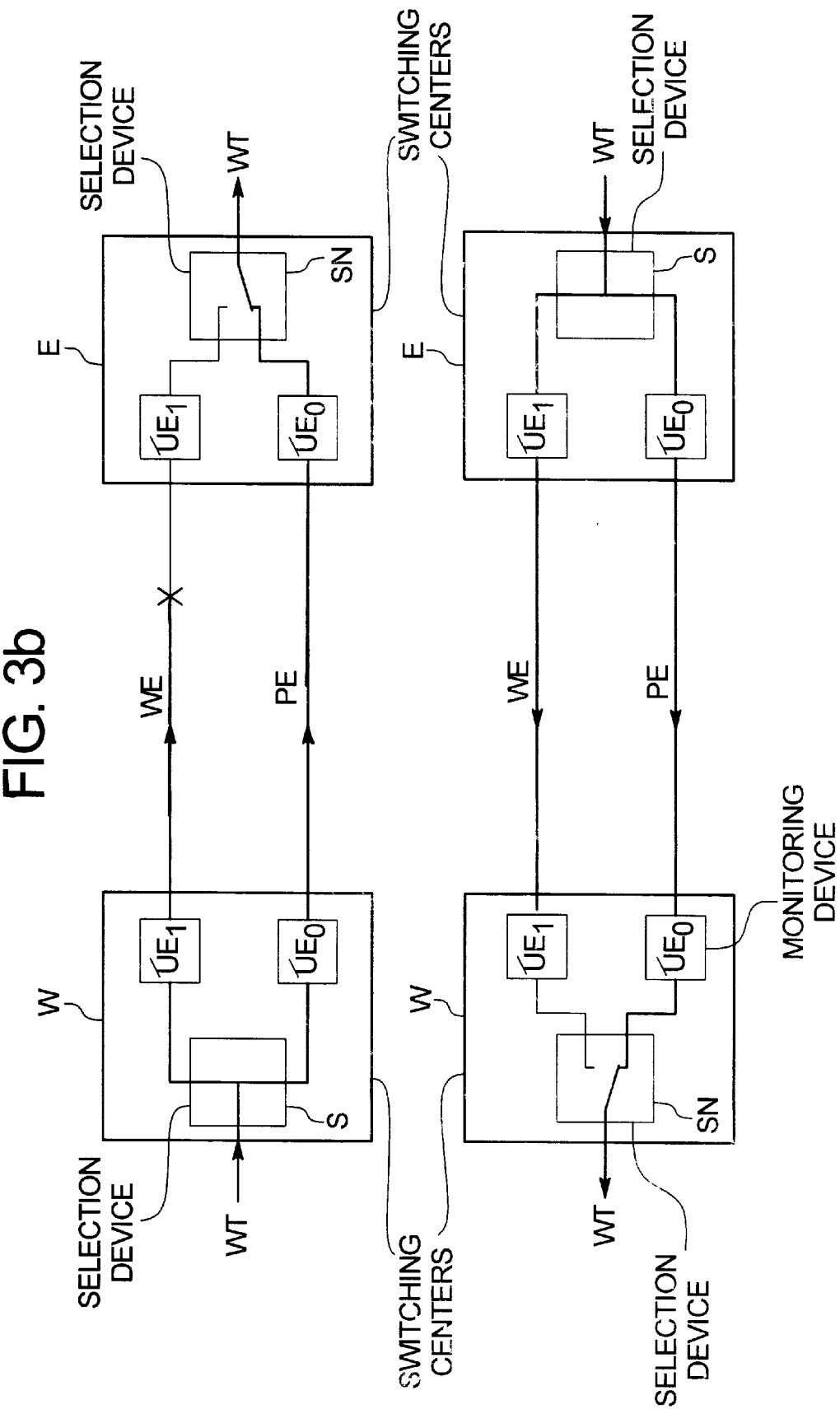

FIG 4

TABLE 1

| K1 Byte Coding: Bits 1 2 3 4 | Request (i.e. automatically initiated command, state, or externally initiated command) | Order of Priority |
|---|---|---|
| 1 1 1 1 | Lockout of Protection (Note 1) | Highest |
| 1 1 1 0 | Signal Fail for Protection Entity (Note 1) | | |
| 1 1 0 1 | Forced Switch for Working Entity #n (Note 5) | | |
| 1 1 0 0 | Signal Fail for Working Entity #n | | |
| 1 0 1 1 | Signal Degrade | | |
| 1 0 1 0 | Unused (Note 2) | | |
| 1 0 0 1 | Unused (Note 2) | | |
| 1 0 0 0 | Manual Switch | | |
| 0 1 1 1 | Unused (Note 2) | | |
| 0 1 1 0 | Wait to Restore for Working Entity #n (Note 3) | | |
| 0 1 0 1 | Unused (Note 2) | | |
| 0 1 0 0 | Unused (Note 2) | | |
| 0 0 1 1 | Unused (Note 2) | | |
| 0 0 1 0 | Unused (Note 2) | | |
| 0 0 0 1 | Do Not Revert for Working Entity #1 (Note 4) | | |
| 0 0 0 0 | No Request (Note 1) | Lowest |

Notes:

Note that in the case that more than one request of the same priority listed in Table 1 is simultaneously active, the request with the lowest entity number takes precedence. Therefore, a request (e.g. Signal Degrade) for the protection entity (#0) overrides the same request for any working entity (#1 to #n), and a request for a working entity #k overrides the same request for any working entity with an entity number greater than k.

Note 1: Only K1 bit 4-8 coding of "0000" is allowed with No Request, Lockout of Protection and Signal Fail for Protection Entity.

Note 2: These codes are ignored by the receiver.

Note 3: Wait to Restore for Working Entity #n is only applicable for revertive operation.

Note 4: Do Not Revert for Working Entity #1 is only applicable for nonrevertive operation; only K1 bit 4-8 coding of "0001" is allowed.

Note 5: Forced Switch for Protection Entity (#0) is not defined because this function may be achieved via a Lockout of Protection command.

SWITCHING TRANSMISSION UNITS TO AN EQUIVALENT CIRCUIT FOR THE PURPOSES OF BIDIRECTIONAL ASYNCHRONOUS CELL TRANSFER

BACKGROUND OF THE INVENTION

The invention relates to a method for switching transmission devices to an equivalent circuit for bidirectional transmission of ATM cells.

Such a method is already known from the international patent application WO94/28646.

This known method relates to transmission devices of the synchronous digital hierarchy (SDH). Here, a transmission device for the bidirectional transmission of digital signals is provided, in which device two switching centers which function as terminals are connected to one another via a service link and a standby link. The two terminals each contain a monitoring device for detecting transmission faults. A switching device which can be controlled by the monitoring device connects a reception device into a first switched state with the service link and in a second switched state with the standby link. Control information is exchanged between the control devices of the two terminals. The switching devices are each controlled by the local monitoring device as a function of local control criteria which are contained in the control information received from the opposite station.

It is a disadvantage here that this known method relates to transmission devices of the synchronous digital hierarchy and cannot be transmitted on transmission devices of the asynchronous transfer mode (ATM). Furthermore, this known method is used on 1+1 and 1:1 structures. However, in relatively complex structures such as 1:n structures, for example, incorrect connections may occur.

In addition, the publication IEICE Transactions on Communications, Vol. E78-B, No. 7, Jul. 1, 1995, pages 987–994, Mitsuhiro Azuma et al. (XP532482) discloses a method and a device for switching ATM links to an equivalent circuit. If a node or a link fails, a standby link is switched to. 1:1, 1+1 or 1:N structures are, however, not referred to here.

SUMMARY OF THE INVENTION

The invention is based on the object of developing a method of the type mentioned at the beginning in such a way that cells which are transmitted according to an asynchronous transfer mode can be transmitted via a plurality of network nodes with a high degree of reliability.

An advantage of the invention is, in particular, that just one standby link is provided and it is assigned to a plurality of service links. The ATM cells of the faulty service link are transmitted on this standby link in accordance with priorities. The receiving switching center then performs switching through operations using a logic operation number. This provides the advantage that in the case of a fault the advantage can be maintained without restriction.

In general terms the present invention is a method for switching transmission devices to an equivalent circuit for the bidirectional transmission of ATM cells. Two switching centers terminate a transmission section formed from a plurality of service links and feed. the information in ATM cells to a respective receiving switching center on the plurality of service links. Monitoring devices are each arranged at the end of a service link and determine a fault on the service link. One standby link is provided between the two switching centers. In the case of a fault on one of the service links, the ATM cells, which are transmitted on the service links, are transmitted on the standby link in accordance with priority criteria and logic operation information contained in the cell header of the ATM cells and are fed to further devices of the ATM network. A priority is assigned tot he service links and to the standby link.

Advantageous developments of the present invention are as follows.

In the event of switching to an equivalent circuit, an equivalent circuit request, to which further priorities are assigned, is generated.

The logic operation information is the number of the virtual path.

Priority tables, in which the priorities are defined, are provided.

The switching to an equivalent circuit is carried out by driving a switching device contained in the transmitting switching center and by using a selection device arranged in the receiving switching center.

The selection device is embodied as an ATM switching matrix.

Special data is transmitted on the standby link during times which are free of service faults.

When an equivalent circuit request arrives in the receiving switching center, an equivalent circuit switching protocol is generated, which is fed just once to the remaining switching center on the standby link.

Total failure and degradation of a service link are determined in the monitoring device of the receiving switching center.

Switching device can be set permanently.

The switching centers are embodied as cross connect switching devices.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 3 shows a further specific refinement of the method according to the invention in a 1+1 structure.

FIG. 4 shows the priorities used, in accordance with which the switching to an equivalent circuit is carried out.

DESCRIPTION OF THE PREFERRED EMBODIMENTS

Figure 1A:
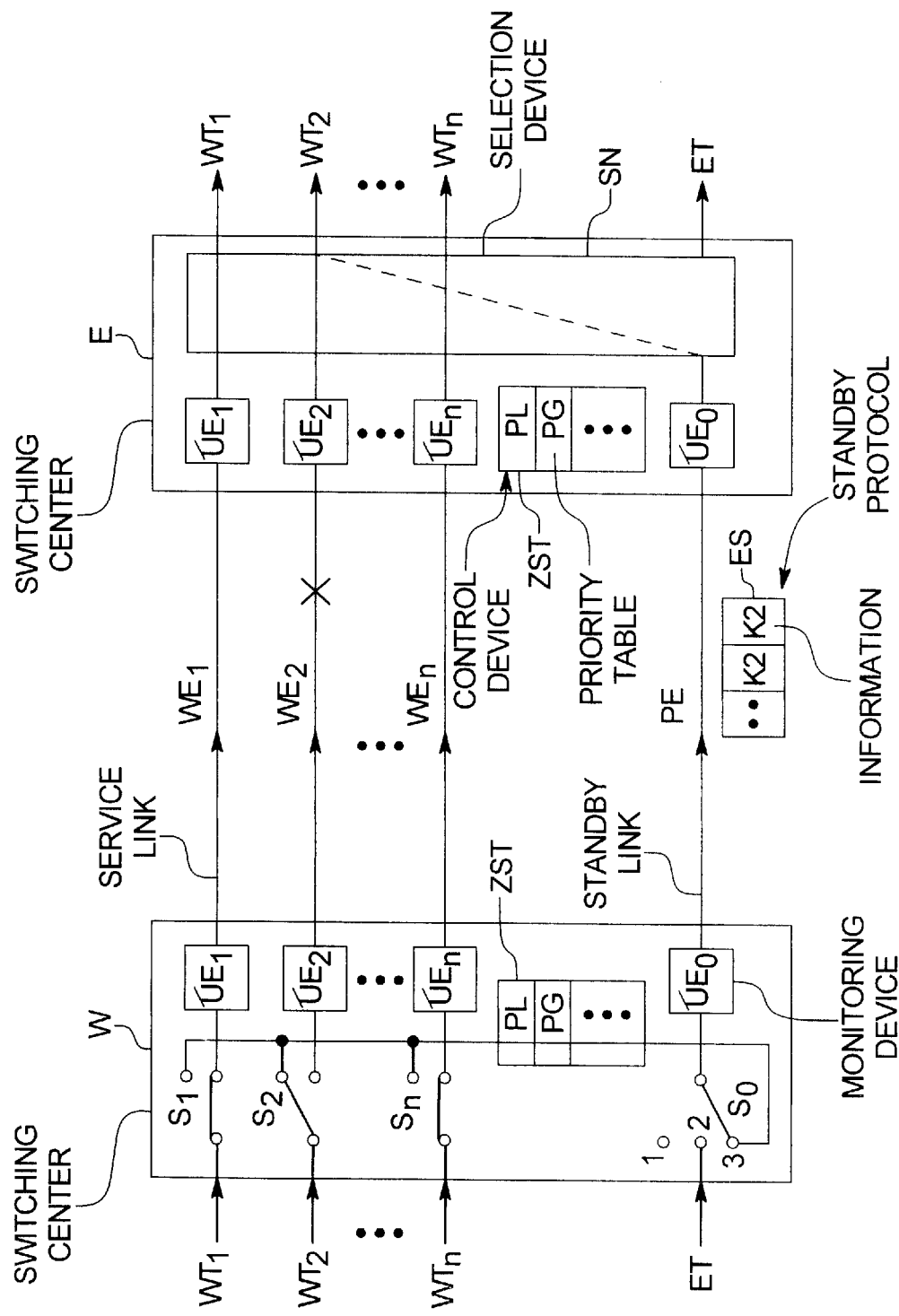
FIG. 1 shows the method according to the invention for the bidirectional transmission of ATM cells in a 1:n structure.
Figure 1B:
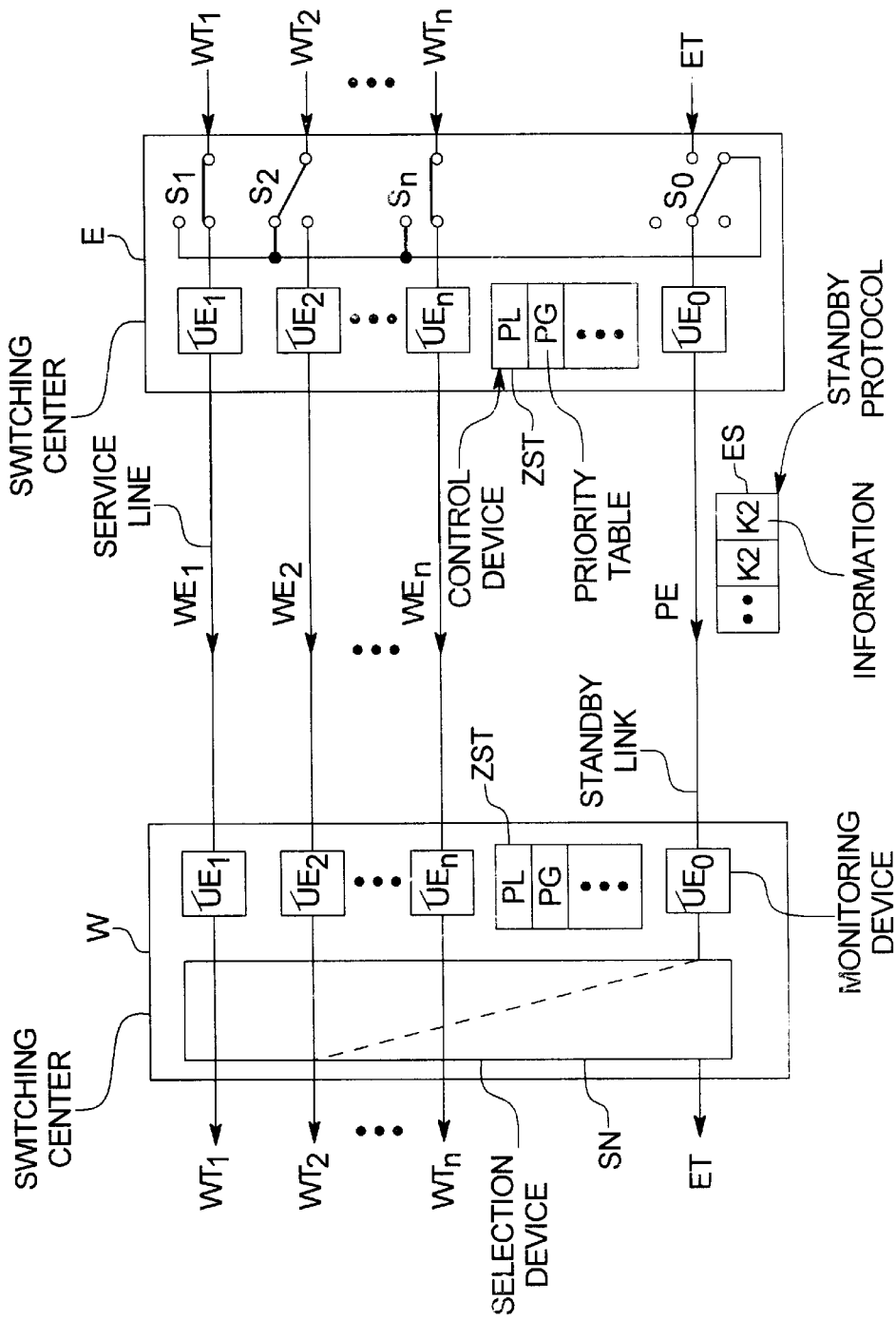

FIG. 1 shows two nodes of an ATM network which are each embodied as a switching center W, E. In the present exemplary embodiment it is assumed that these switching centers are cross connect switching centers. The use of switching centers of this design does not, however, signify any limitation of the invention; other switching centers can also be used. FIG. 1a shows the transmission of ATM cells from the switching center W to the switching center E, whereas FIG. 1b discloses the reverse direction of this link.

The switching centers W, E are connected to one another by means of service links $WE_1 \ldots WE_n$ (WORKING ENTITY) and just one standby link PE (PROTECTION ENTITY). In addition, switch devices $S_0 \ldots S_n$ (BRIDGE) are shown, via which the incoming ATM cells and the associated service links $WE_1 \ldots WE_n$ are transmitted to the switching center E. The ATM cells are transmitted according to an asynchronous transfer mode and each have a header part and an information part. The header part is used to hold connection information while the information part can be used to hold user information. The connection information contained in the header part is in the form of logic information and is usually embodied as a virtual path number VPI or virtual channel number VCI.

In addition, FIG. 1 shows selection devices SN whose function consists in feeding the ATM cells transmitted on the service links $WE_1 \ldots WE_n$ to the output of the switching center E. According to the present exemplary embodiment, the selection devices SN are embodied as a ATM switching matrix. The ATM switching matrix SN is contained both in the switching center W and the switching center E.

In addition, monitoring devices $UE_0 \ldots UE_n$ (PROTECTION DOMAIN SINK, PROTECTION DOMAIN SOURCE), which monitor the state or the quality of the ATM cells transmitted on the service links $WE_1 \ldots WE_n$, are shown in both switching centers W, E. For example, the ATM cells of the link with the number $1$ $WT_1$ are provided, before they are transmitted to the switching center E on the service link $WE_1$, with control information in the monitoring device $UE_1$ of the switching center W, which information is extracted from the receiving switching center E, and checked, by the monitoring device $UE_1$. With reference to this control information it is then possible to determine whether or not the ATM cell is being transmitted correctly. In particular, it is possible to determine a total failure (SIGNAL FAIL FOR WORKING ENTITY) of one of the service links $WE_1 \ldots WE_n$ here. Likewise, degradation of the transmission quality (SIGNAL DEGRADE) can be determined, but also using known methods.

The monitoring devices $UE_1 \ldots UE_n$ terminate the service links $WE_1 \ldots WE_n$ at both ends. Further monitoring devices $UE_0$ are arranged at both ends of the standby link PE. The latter is intended to serve, in the case of a fault, as a transmission link for the service link $WE_x$ which is taken out of operation. In addition, equivalent circuit switching protocols ES are transmitted in this way so that the intactness of the standby link has top priority.

In addition, central control devices ZST are arranged in each of the switching centers W, E. The control devices ZST each contain priority tables PG, PL. The priority tables PL are local priority tables in which the state and priority of the local switching center is stored. The priority tables PG are global priority tables in which there is the state and priority of the local, but also remaining, switching center. The introduction of the priorities ensures that when a plurality of equivalent circuit requests occur at the same time it is defined which service link will be switched to an equivalent circuit. Likewise, the equivalent circuit requests are prioritized in the priority tables. Thus, there is, for example, a high priority request by a user. Since this equivalent circuit request is assigned a high priority, it is thus controlled with preference. An equivalent circuit request which is controlled by one of the service links is thus rejected. The individual priorities are shown in FIG. 4.

The central control devices ZST of the switching centers W, E exchange information in a standby protocol ES. This protocol is transmitted on the standby link PE and obtained from the associated monitoring device $UE_0$ of the respective receiving switching center, and fed to the relevant central control device ZST. In addition, measures in the central control device ZST ensure that, in the event of a fault, the switching devices $S_0 \ldots S_n$ are controlled in a corresponding way.

Information K2 is stored in the protocol ES. This is information relating to the instantaneous states of the switching,devices. Information K1 is also stored. This is information relating to the generated equivalent circuit request. The protocol is exchanged between the two switching centers whenever the equivalent circuit request is generated. In one specific refinement of the invention it is provided that the protocol ES be transmitted cyclically between the two switching centers.

The way in which the method according to the invention will be carried out will be explained in more detail below with reference to FIG. 1. FIG. 1a shows the transmission of the ATM cells from the switching center W to the switching center E via the service links $WE_1 \ldots WE_n$. The associated opposite direction (bidirectional transmission) is explained in FIG. 1b. In the present exemplary embodiment it is then initially assumed that the service links $WE_1 \ldots WE_n$ are still intact and the incoming ATM cells are transmitting correctly.

According to FIG. 1a, the ATM cells are fed to the switching center W. The ATM cells are associated here with a plurality of links $WT_1 \ldots WT_n$. The individual links are distinguished with reference to the logic operation number VPI entered in the header part of the ATM cells.

The switching devices $S_1 \ldots S_n$ of the switching center W are switched, in this (still intact) operating situation, in such a way that the ATM cells are fed directly to the monitoring devices $UE_1 \ldots UE_n$. In the latter devices, the ATM cells are provided with the control information already referred to and fed on the respective service link $WE_1 \ldots WE_n$ to the monitoring devices $UE_1 \ldots UE_n$ of the receiving switching center E. The control information which is also carried is checked there and, if appropriate, a fault situation is determined. If the transmission has taken place correctly, the ATM cells are fed to the ATM switching matrix SN. Here, the logic operation information VPI is evaluated and the ATM cell is passed on to the ATM network via the respective output of the switching matrix SN in accordance with this evaluation.

The standby link PE can remain unused during this time. However, if appropriate, special data (EXTRA TRAFFIC) can also be fed to the switching center E during this time. The switching device $S_0$ of the switching center W therefore assumes the positions 1 or 3. The special data are also transmitted in ATM cells. The monitoring device $UE_0$ of the of the switching center W feeds control information to the ATM cells in the same way as has already been described for the case of the on the service links $WE_1 \ldots WE_n$. The link is also monitored.

It is assumed below that the service link $WE_2$ has failed. This is determined by the monitoring device $UE_2$, assigned to the latter, of the receiving switching center E. The equivalent circuit request K1 is then transmitted to the respective central control device ZST and stored there in the local priority table PL and the global priority table PG.

In accordance with the priorities stored in the global priority table PG it is then determined whether requests with still higher priorities are present. These could be, for example, the user's switchover request (FORCED SWITCH FOR WORKING ENTITY) already mentioned. Even if other fault situations, such as on the service link $WE_1$, for example, occur simultaneously, the equivalent circuit of this service link would be handled with preference since a higher priority is assigned to this service link. In this case, a request with higher priority is handled first. The priorities stored in the local and global priority tables PL, PG are shown in FIG. 4.

If there are no requests present with higher priority, the switching device $S_2$ of the switching center E is placed in the remaining operating state, as shown in FIG. 1b. The equivalent circuit switching protocol ES is then fed to the switching center W on the standby link PE. The information K1 and K2 already mentioned is contained in this equivalent circuit switching protocol. The central feature is that the local priority logic defines the configuration of the information K1, and the global priority logic defines the position of the switching device $S_0$.

The equivalent circuit switching protocol ES is then transferred from the monitoring device $UE_0$ of the switching center E and fed to the central control device ZST of the switching center W. If there are no further requests with higher priority present in the global priority table PG here either, the switching device $S_2$ is also driven and set here in a corresponding way. In addition, the switching device $S_0$ of the switching center W is also switched over. The new status of the two switching devices $S_0$, $S_2$ is acknowledged to the switching center E and updated in the global priority table PG there. The ATM cells of the link $WT_2$ are thus fed to the switching center E on the standby link PE.

The selection device SN of the switching center E is embodied as an ATM switching matrix. The ATM cells transmitted on the standby link PE are fed to this switching matrix. Here, the logic path number VPI is obtained from the cell header and evaluated and routed through the switching matrix. The driving of switching devices is thus omitted in this case.

Since these links are a bidirectional link, it is also necessary to take measures to ensure the transmission of the ATM cells in the reverse direction. This is carried out according to FIG. 1b in the same way as has just been described for the transmission of the ATM cells from the switching center W to the switching center E.

Figure 2B:
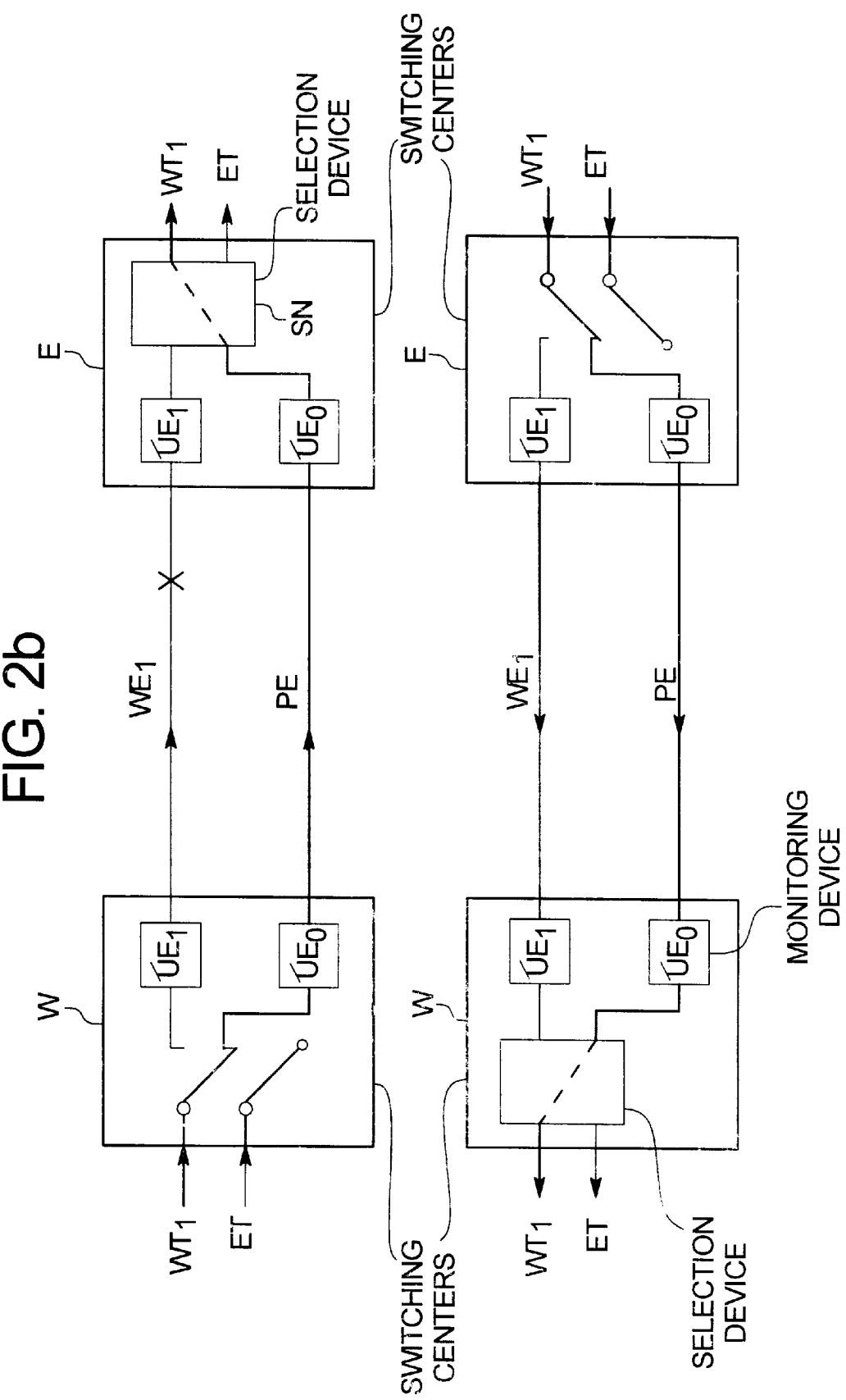
FIG. 2 shows a specific refinement of the method according to the invention in a 1:1 structure.

In the exemplary embodiment just described, a 1:n structure was assumed. This means that there is just one standby link available for n service. links. It is therefore a special case if n=1. In this case, a 1:1 structure is therefore used. The corresponding conditions are shown in FIG. 2.

The selection device is also embodied as an ATM switching money in this case so that switching through is carried out in accordance with the VPI number. The switching centers according to FIG. 2 also contain central control devices (not shown) with local and global priority tables.

A further refinement of the invention is shown in FIG. 3. This is a 1+1 structure. This structure is obtained from the 1:n structure in that the switching devices S are set permanently and can no longer be controlled by means of the central control devices ZST. In this way, the ATM cells are transmitted both on the service link WE and on the standby link PE, even in a fault-free operating situation. The selection device SN is not embodied here as an ATM switching matrix but rather as a switching device. The equivalent circuit switching protocol ES assumes a simpler. form in this case. The information K2 describes the state of the selection device here. Whenever, in the case of the 1:n structure, the switching devices $S_0 \ldots S_n$ have been controlled, in the case of the 1+1 structure the selection device SN is controlled instead.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for switching transmission devices to an equivalent circuit for bidirectional transmission of ATM cells in an ATM network, the ATM network having at least two switching centers which each terminate a transmission section formed from a plurality of service links, comprising the steps of:

feeding information in ATM cells to a respective receiving switching center of the two switching centers connected to the plurality of service links;

providing monitoring devices, each of which are arranged at an end of a respective service link of the plurality of service links and by which a fault on the respective service link is determined;

providing one standby link between the two switching centers;

transmitting when a fault occurs on one of the service links, the ATM cells, which are transmitted on the service links, on said standby link in accordance with priority criteria and logic operation information contained in a cell header of the ATM cells, the ATM cells thereby being fed to further devices of the ATM network, a priority being assigned to the service links and to the standby link.

2. The method as claimed in claim 1, wherein for switching to an equivalent circuit, an equivalent circuit request, to which further priorities are assigned, is generated.

3. The method as claimed in claim 1, wherein the logic operation information is a number of a virtual path.

4. The method as claimed in claim 1, wherein the method further comprises the use of priority tables, in which the priorities are defined, are provided.

5. The method as claimed in claim 1, wherein the switching to an equivalent circuit is carried out by driving a switching device contained in the transmitting switching center of the two switching centers and by using a selection device arranged in the receiving switching center of the two switching centers.

6. The method as claimed in claim 5, wherein the selection device is an ATM switching matrix.

7. The method as claimed in claim 1, wherein special data is transmitted on the standby link during times which are free of service faults.

8. The method as claimed in claim 1, wherein, when an equivalent circuit request arrived in the receiving switching center of the two switching centers, an equivalent circuit switching protocol is generated, which is fed only once to a remaining switching center of the two switching centers on the standby link.

9. The method as claimed in claim 1, wherein total failure and degradation of a service link are determined in a monitoring device of the receiving switching center.

10. The method as claimed in claim 5, wherein the switching device is permanently settable.

11. The method as claimed in claim 1, wherein the at least two switching centers are embodied as cross connect switching devices.

* * * * *